(12) United States Patent
Lee et al.

(10) Patent No.: US 9,239,629 B2
(45) Date of Patent: Jan. 19, 2016

(54) KEYSTROKE DETERMINATION METHOD AND DEVICE THEREOF

(71) Applicant: MSI ELECTRONIC (KUN SHAN) CO., LTD., Kunshan, Jiangsu (CN)

(72) Inventors: Yu-Szu Lee, Taipei (TW); Hsin-Huang Tsai, New Taipei (TW); Chien-Ming Huang, New Taipei (TW)

(73) Assignee: MSI ELECTRONIC (KUN SHAN) CO., LTD., Kunshan (CN)

( * ) Notice: Subject to any disclaimer, the term of this patent is extended or adjusted under 35 U.S.C. 154(b) by 343 days.

(21) Appl. No.: 13/934,088

(22) Filed: Jul. 2, 2013

(65) Prior Publication Data

US 2014/0306895 A1 Oct. 16, 2014

(30) Foreign Application Priority Data

Apr. 12, 2013 (TW) .............................. 102113137 U

(51) Int. Cl.
G06F 3/02 (2006.01)
G09G 5/00 (2006.01)
G06F 3/023 (2006.01)

(52) U.S. Cl.
CPC .............. *G06F 3/023* (2013.01); *G06F 3/0233* (2013.01)

(58) Field of Classification Search
CPC .... G06F 3/0202; G06F 3/0219; G06F 3/0213
USPC ............... 345/156–158, 168–179; 341/21–23
See application file for complete search history.

(56) References Cited

U.S. PATENT DOCUMENTS

| | | | |
|---|---|---|---|
| 9,052,821 B2 * | 6/2015 | Zhao et al. | 345/168 |
| 2010/0238120 A1 * | 9/2010 | Hsieh | 345/170 |

* cited by examiner

*Primary Examiner* — Kimnhung Nguyen
(74) *Attorney, Agent, or Firm* — Maschoff Brennan

(57) ABSTRACT

A keystroke determination method and a device thereof are applicable to a keyboard input device. The keystroke determination device performs the keystroke determination method including the following steps. A triggering signal corresponding to both a first circuit node and a second circuit node of the keyboard input device is received. Whether a first key definition of the first circuit node represents a null key is determined. When the first key definition of the first circuit node represents the null key, a signal specifying a second key definition of the second circuit node is outputted.

14 Claims, 5 Drawing Sheets

KEYSTROKE DETERMINATION METHOD AND DEVICE THEREOF

CROSS-REFERENCE TO RELATED APPLICATIONS

This non-provisional application claims priority under 35 U.S.C. §119(a) on Patent Application No(s). 102113137 filed in Taiwan, R.O.C. on Apr. 12, 2013, the entire contents of which are hereby incorporated by reference.

TECHNICAL FIELD

The disclosure relates to a keystroke determination method and a device thereof, more particularly to a keystroke determination method and a device thereof which are used for avoiding ghost keys.

BACKGROUND

For input devices, the keyboard is now the most widespread in use. In order to reduce manufacture costs and to simplify product design, the membrane keyboard spent lower cost and including a matrix circuit board gradually replaces the mechanical keyboard spent higher cost.

Generally, a situation associated with ghost keys may occur in the membrane keyboard using a matrix circuit board. Assume that the matrix circuit board includes two x-axis circuits, i.e. an upper x-axis circuit and a lower x-axis circuit, and two y-axis circuits crossing the two x-axis circuits, i.e. an upper y-axis circuit and a lower y-axis circuit, to form a square. Four nodes of the square respectively correspond to an upper left key, a lower left key, an upper right key and a lower right key sorted clockwise. When the upper left key, the lower left key and the upper right key are pressed simultaneously, the lower right key will be regarded as being pressed. Herein, four signals respectively specifying these keys are generated even though the upper right key is not pressed actually. This is called a ghost key phenomenon in the art.

Two solutions for avoiding the ghost key phenomenon have been used so far. One is to use firmware. The other one is to dispose a diode at each node to detect whether any ghost key occurs. However, using firmware may make the input of all keys failed to result in the word leakage when the ghost key phenomenon occurs, and disposing diodes may increase manufacturing costs. Therefore, it is necessary to have other solutions for avoiding the ghost key phenomenon.

SUMMARY

A keystroke determination method according to an embodiment of the disclosure is applicable to a keyboard input device and includes the following steps. A triggering signal corresponding to both a first circuit node and a second circuit node of the keyboard input device is received. Whether a first key definition of the first circuit node represents a null key is determined. When the first key definition of the first circuit node represents the null key, a signal specifying a second key definition of the second circuit node is outputted.

In an embodiment of the disclosure, the triggering signal is outputted by a matrix circuit unit formed by crossing x-axis circuits with y-axis circuits.

In an embodiment of the disclosure, the keystroke determination method further includes the following steps. When the first key definition of the first circuit node does not present the null key, whether the second key definition of the second circuit node represents the null key is determined. When the second key definition of the second circuit node represents the null key, a signal specifying the first key definition of the first circuit node is outputted.

In an embodiment of the disclosure, the keystroke determination method further includes the following step. When the first key definition of the first circuit node and the second key definition of the second circuit node do not represent the null key, the triggering signal is set as a failed signal.

In an embodiment of the disclosure, the keystroke determination method further includes the following steps. Whether the first key definition of the first circuit node represents a specific function key is determined. When the first key definition of the first circuit node represents the specific function key, the signal specifying the second key definition of the second circuit node is outputted.

In an embodiment of the disclosure, the keyboard input device wirelessly or wiredly connects to a terminal device.

In an embodiment of the disclosure, the null key represents that its key definition has not been defined.

A keystroke determination device according to an embodiment of the disclosure is applicable to a keyboard input device and includes a key unit, a matrix circuit unit and a processing unit. The matrix circuit unit connects to the key unit, and is used for outputting a triggering signal corresponding to both a first circuit node and a second circuit node of the matrix circuit unit. The processing unit connects to the matrix circuit unit, and is used for receiving the triggering signal, and determining whether a first key definition of the first circuit node represents a null key. When the first key definition of the first circuit node represents the null key, the processing unit outputs a signal specifying a second key definition of the second circuit node.

In an embodiment of the disclosure, when the first key definition of the first circuit node and the second key definition of the second circuit node do not represent the null key, the processing unit sets the triggering signal as a failed signal. When the first key definition of the first circuit node represents the null key, the processing unit outputs a signal specifying the first key definition of the first circuit node.

In an embodiment of the disclosure, the key unit includes a plurality of keys, and the matrix circuit unit is formed by crossing x-axis circuits with y-axis circuits.

BRIEF DESCRIPTION OF THE DRAWINGS

The disclosure will become more fully understood from the detailed description given herein below for illustration only and thus does not limit the disclosure, wherein.

DETAILED DESCRIPTION

Figure 1:
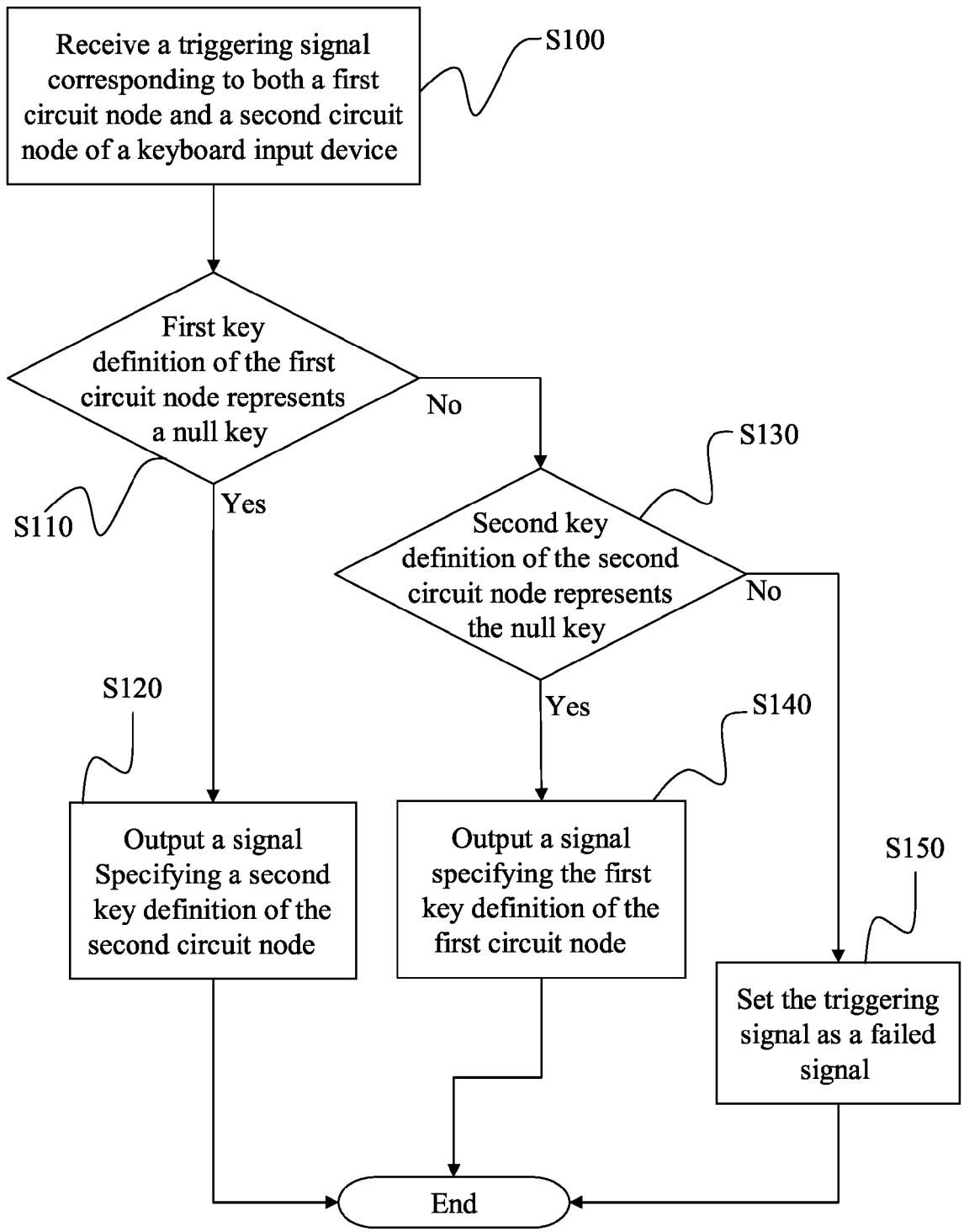
FIG. 1 is a flowchart of a keystroke determination method according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a flowchart of a keystroke determination method according to an embodiment of the disclosure. The keystroke determination method includes the following steps. Firstly, a triggering signal corresponding to both a first circuit node and a second circuit node of a keyboard input device is received (step S100). Whether a first key definition of the first circuit node represents a null key is determined (step S110).

When the first key definition of the first circuit node represents the null key, a signal specifying a second key definition of the second circuit node is outputted (step S120), and the keystroke determination method is finished. When the first key definition of the first circuit node does not represent the null key, whether a second key definition of the second circuit node represents the null key is further determined (step S130).

When the second key definition of the second circuit node represents the null key, a signal specifying the first key definition of the first circuit node is outputted (step S140), and the keystroke determination method is finished. When the first key definition of the first circuit node and the second key definition of the second circuit node do not represent the null key, the triggering signal is set as a failed signal (step S150), and the keystroke determination method is finished. The detailed operation of the keystroke determination method is described with other drawings as follows.

Figure 2:
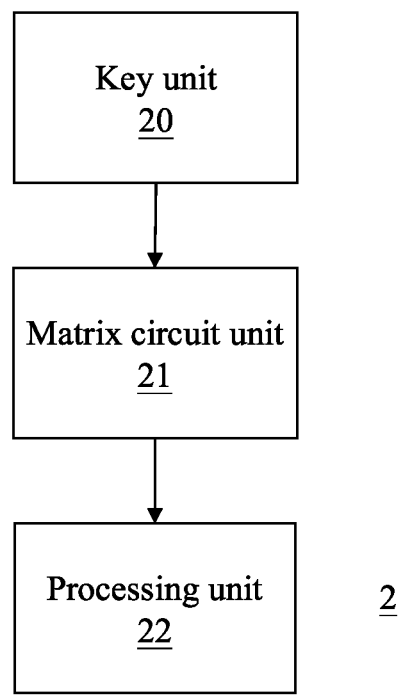
FIG. 2 is a block diagram of a keystroke determination device according to an embodiment of the disclosure.

FIG. 2 is a block diagram of a keystroke determination device according to an embodiment of the disclosure. A keystroke determination device 2 wirelessly or wiredly communicates with a terminal device, e.g. a table computer or a notebook. The wired communication manner includes the universal serial bus (USB) and the personal system/2 (PS/2) bus. The wireless communication manner includes the Bluetooth protocol. The keystroke determination device 2 includes a key unit 20, a matrix circuit unit 21 and a processing unit 22. The key unit 20 includes a plurality of keys for pressing, so as to output a corresponding triggering signal.

The matrix circuit unit 21 connects to the key unit 20 and is formed by crossing x-axis circuits with y-axis circuits. One x-axis circuit and one y-axis cross each other to form a circuit node. A key corresponding to one of the circuit nodes in the matrix circuit unit 21 is set as a null key. The null key is a fact to determine whether the ghost key phenomenon occurs or not. When one key in the key unit 20 is pressed, the circuit node corresponding to the pressed key in matrix circuit unit 21 outputs a corresponding triggering signal to the processing unit 22. The processing unit 22, e.g. a processor in a device, can connect to an output unit for outputting signals.

Specifically, refer to FIG. 1 and FIG. 2, the processing unit 22 receives the triggering signal corresponding to both a first circuit node and a second circuit node of the matrix circuit unit 21 and being outputted by the matrix circuit unit 21 (step S100). In other words, the triggering signal has a first key definition of the first circuit node and a second key definition of the second circuit node simultaneously.

Subsequently, the processing unit 22 determines whether the first key definition of the first circuit node represents the null key (step S110), where the processing unit 22 analyzes the triggering signal and determines the source of the triggering signal. The null key means that its definition has not been defined, and represents an unused circuit node in the matrix circuit unit 21.

When the first key definition of the first circuit node represents the null key, the processing unit 22 outputs a signal specifying the second key definition of the second circuit node (step S120). In this case, the matrix circuit unit 21 has only one circuit node set as the null key, and the triggering signal corresponds to the first circuit node and the second circuit node simultaneously. Therefore, when the processing unit 22 determines the first key definition of the first circuit node represents the null key, the processing unit 22 considers that the triggering signal comes from the second circuit node, and then outputs a signal specifying the second key definition of the second circuit node.

In contrast, when the processing unit 22 determines that the first key definition of the first circuit node does not represent the null key, the processing unit 22 determines whether the second key definition of the second circuit node represents the null key (step S130). In other words, the processing unit 22 can determine the second key definition of the second circuit node besides the first key definition of the first circuit node, thereby determining the source of the triggering signal more accurate.

When the second key definition of the second circuit node represents the null key, the processing unit 22 outputs a signal specifying the first key definition of the first circuit node (step S140). In other words, the processing unit 22 analyzes the key definition corresponding to the triggering signal, to know that the second key definition of the second circuit node represents the null key, and that the key corresponding to the first circuit node is really pressed. Therefore, the processing unit 22 outputs the signal specifying the first key definition of the first circuit node.

When the second key definition of the second circuit node does not represent the null key, the processing unit 22 considers that the triggering signal is failed (step S150). In other words, the processing unit 22 checks the first key definition of the first circuit node and the second key definition of the second circuit node to confirm that the keys corresponding to the first and second key definitions are not the null key. Because the processing unit 22 ensures that the triggering signal is not generated by the key of the first circuit node or the second circuit node, the processing unit 22 sets the triggering signal as a failed signal and does nothing for the triggering signal.

In this and some embodiments, when the first key definition of the first circuit node does not represent the null key in step S110, the processing unit 22 further determines whether the first key definition of the first circuit node represents a specific function key. When the first key definition of the first circuit node represents the specific function key, the processing unit 22 directly outputs a signal specifying the second key definition of the second circuit node (step S120). In contrast, when the first key definition of the first circuit node does not represent the specific function key, the processing unit 22 subsequently determines whether the second key definition of the second circuit node represents the null key (step S130). The specific function key, e.g. the Num Lock key or the Caps Lock key, is used independently and only has a single function. Moreover, the specific function key is embodied independently and its circuit does not cross any x-axis circuit or any y-axis circuit in the matrix circuit unit 21, so that the specific function key can not be used with other keys.

Figure 9:
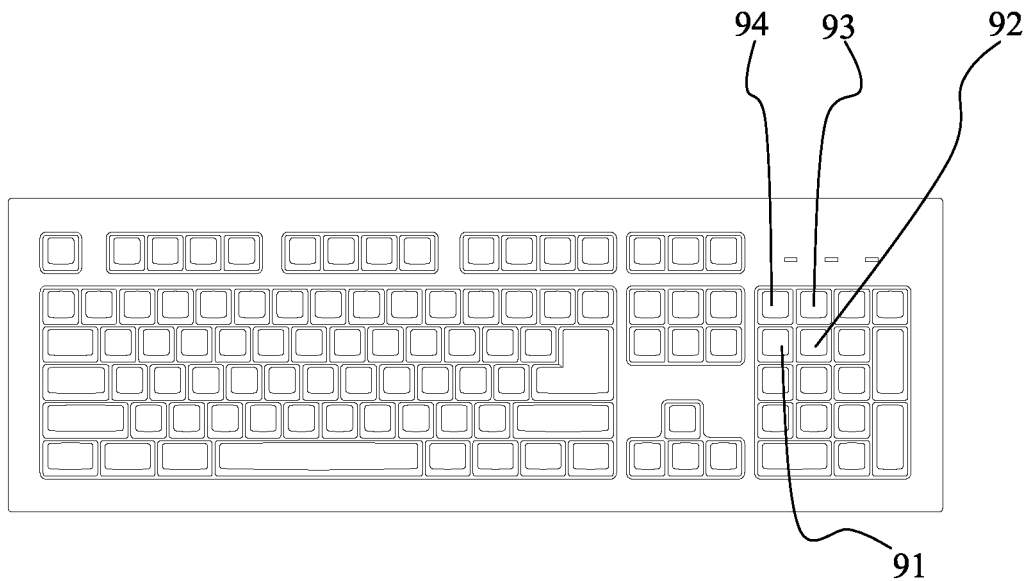
FIG. 9 is a schematic diagram of a keyboard input device in use according to an embodiment of the disclosure.

Assume that the specific function key is the Num-Lock key 94 of the keyboard input device in FIG. 9, which is used for enabling or disabling mineral keys, i.e. keys of "0" to "9". In this embodiment, the Num-Lock key 94 is the specific function key, so when a key 91 of "7" and a key 92 of "8" are pressed and then a key 93 of "/" is pressed, the processing unit 22 directly outputs a signal specifying the key 93 of "/".

Figure 3:
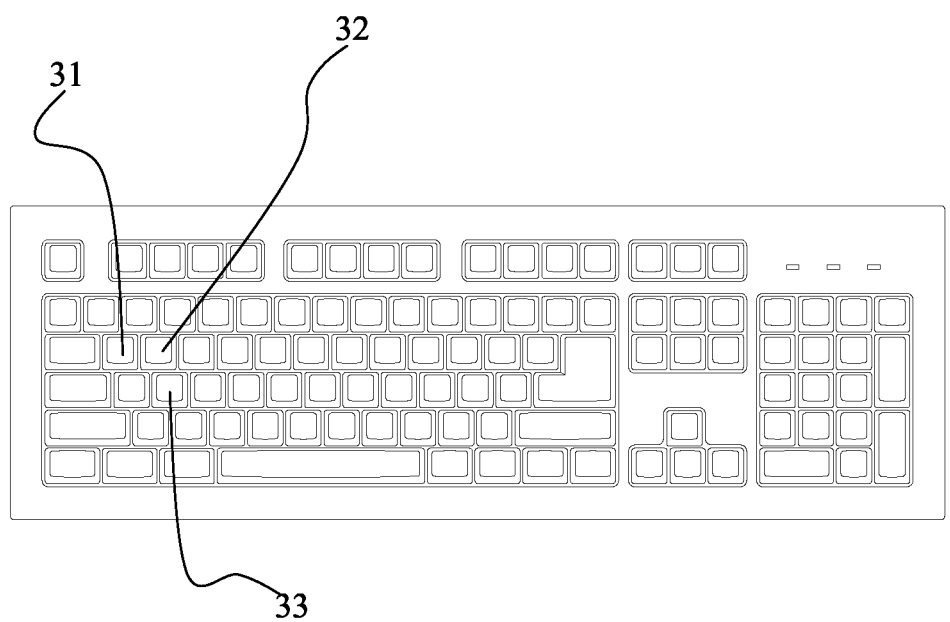
FIG. 3 is a schematic diagram of a keyboard input device in use according to an embodiment of the disclosure.
Figure 4:
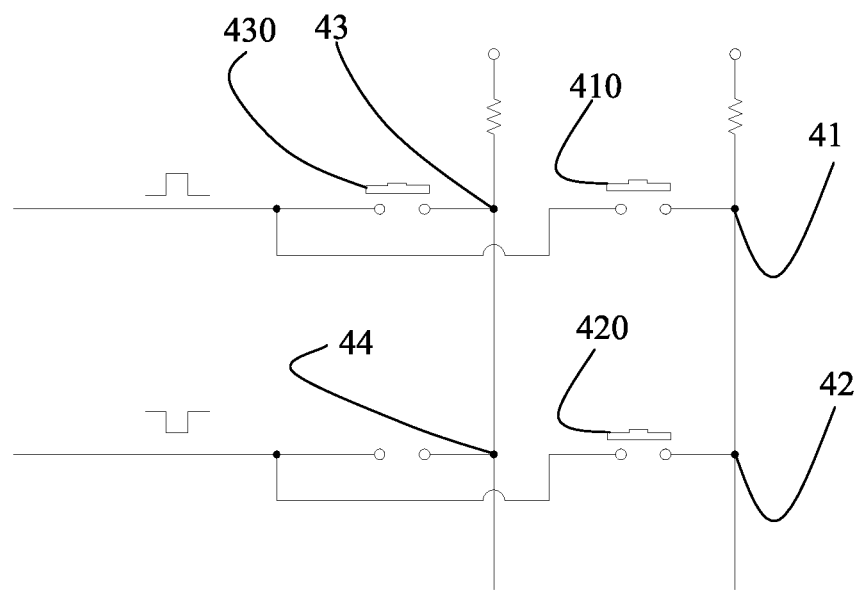
FIG. 4 is a schematic circuit diagram of a matrix circuit unit implemented in FIG. 3 according to an embodiment of the disclosure.

Refer to FIG. 3 which is a schematic diagram of a keyboard input device in use according to an embodiment of the disclosure, and FIG. 4 which is a schematic circuit diagram of a matrix circuit unit implemented in FIG. 3 according to an embodiment of the disclosure. A key 31 in FIG. 3 corresponds to the key of "Q", a key 32 in FIG. 3 corresponds to the key of "W", and a key 33 in FIG. 3 corresponds to the key of "S," the key 31 corresponds to a key 430 in FIG. 4, the key 32 corresponds to a key 410 in FIG. 4, and the key 33 corresponds to a key 420 in FIG. 4.

Firstly, when the keys 32 and 33 which respectively correspond to the keys 410 and 420 are pressed, a circuit node 41 and a circuit node 42 electrically connect to the processing unit 22. Subsequently, the key 31 corresponding to the key 430 is pressed, so that the first circuit node 43 and the second circuit node 44 electrically connect to the processing unit 22.

In this case where the first circuit node 43 and the second circuit node 44 electrically connect to the processing unit 22 simultaneously, the processing unit 22 has to determine to output a signal specifying a key definition of the first circuit node 43 or of the second circuit node 44, so as to avoid the ghost key phenomenon. Assume that the matrix circuit unit 21 is scanned from up to down and from left to right, and a key corresponding to the second circuit node 44 is preset as a null key. The processing unit 22 analyzes a key definition of the first circuit node 43 to ensure that the key definition of the first circuit node 43 does not represent the null key, and then to analyze the key definition of the second circuit node 44. Therefore, the processing unit 22 can know that the key definition of the second circuit node 44 represents the null key due to the presetting. Subsequently, the processing unit 22 can ensure that the triggering signal comes from the first circuit node 43, and then outputs a signal specifying the key definition of the first circuit node 43.

Figure 5:
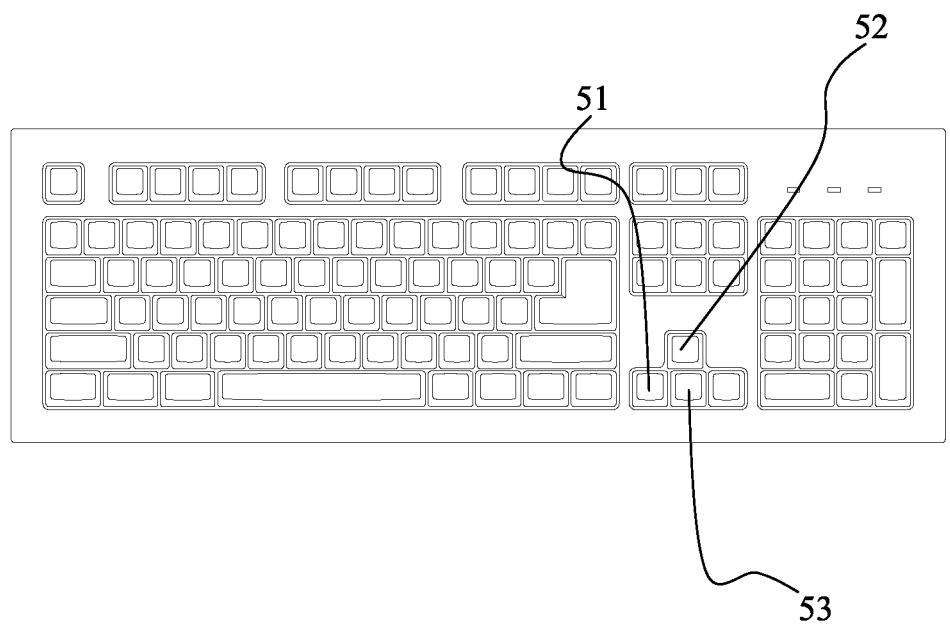
FIG. 5 is a schematic diagram of a keyboard input device in use according to an embodiment of the disclosure.
Figure 6:
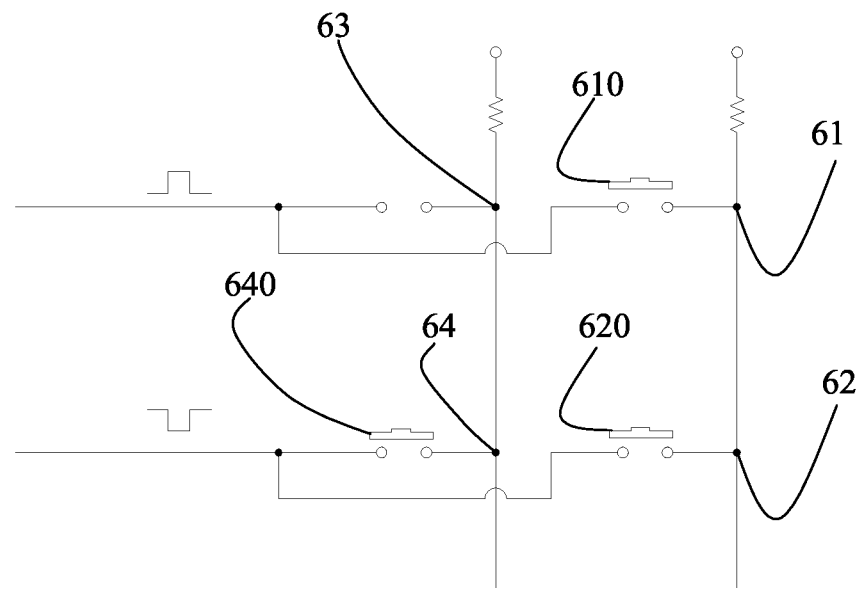
FIG. 6 is a schematic circuit diagram of a matrix circuit unit implemented in FIG. 5 according to an embodiment of the disclosure.

Refer to FIG. 5 which is a schematic diagram of a keyboard input device in use according to an embodiment of the disclosure, and FIG. 6 which is a schematic circuit diagram of a matrix circuit unit implemented in FIG. 5 according to an embodiment of the disclosure. In this embodiment, a key 51 in FIG. 5 corresponds to the left-direction key of the keyboard input device, a key 52 in FIG. 5 corresponds to the up key of the keyboard input device, a key 53 in FIG. 5 corresponds to the down key of the keyboard input device, the key 51 corresponds to a key 640 in FIG. 6, the key 52 corresponds to a key 610 in FIG. 6, and the key 53 corresponds to a key 620 in FIG. 6.

If the key 52 and the key 53 which respectively correspond to the key 610 and the key 620 are pressed, the circuit node 61 and the circuit node 62 electrically connect to the processing unit 22 simultaneously. Subsequently, the key 51 corresponding to the key 640 is pressed, so that the first circuit node 63 and the second circuit node 64 electrically connect to the processing unit 22. When the first circuit node 63 and the second circuit node 64 electrically connect to the processing unit 22 simultaneously, the processing unit 22 has to determine to output a signal specifying a key definition of the first circuit node 63 or of the second circuit node 64, so as to avoid the ghost key phenomenon.

Assume that the matrix circuit unit 21 is scanned from up to down and from left to right, and a key corresponding to the first circuit node 63 is preset as a null key. The processing unit 22 analyzes a key definition of the first circuit node 63 and then can know that the key definition of the first circuit node 63 represents the null key. Therefore, the processing unit 22 can know the triggering signal comes from the second circuit node 64, so as to output a signal specifying the key definition of the second circuit node 64.

Figure 7:
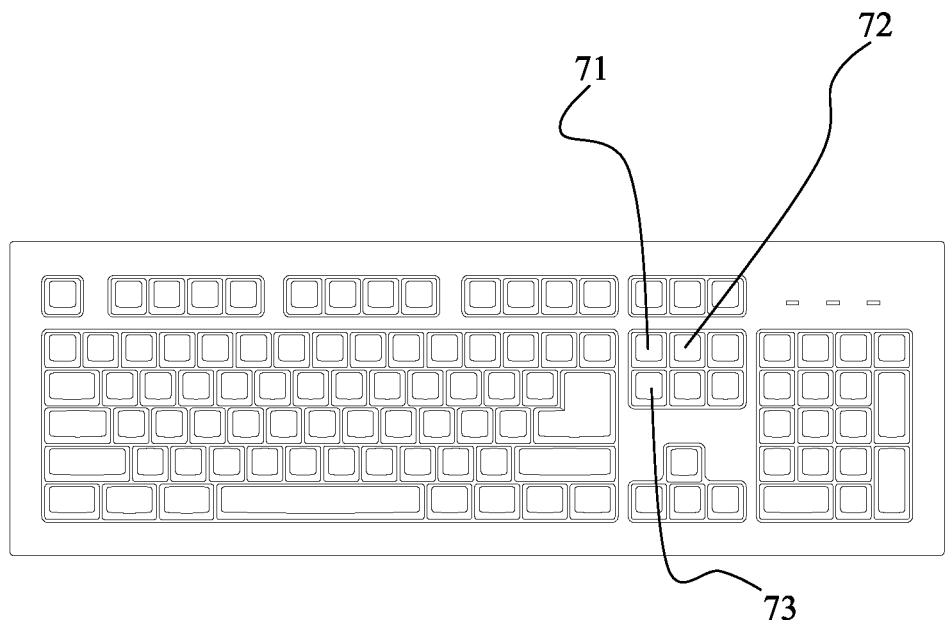
FIG. 7 is a schematic diagram of a keyboard input device in use according to an embodiment of the disclosure.
Figure 8:
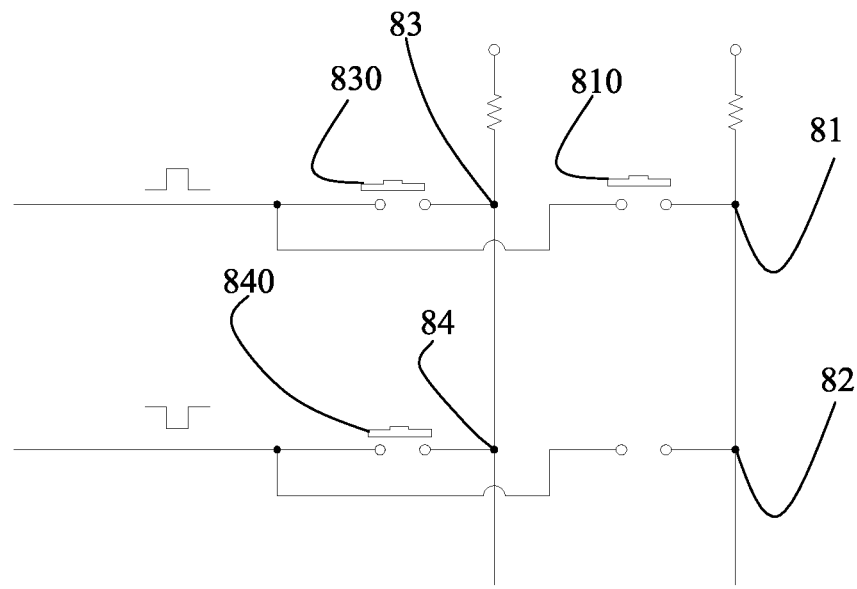
FIG. 8 is a schematic circuit diagram of a matrix circuit unit implemented in FIG. 7 according to an embodiment of the disclosure.

Refer to FIG. 7 which is a schematic diagram of a keyboard input device in use according to an embodiment of the disclosure, and FIG. 8 which is a schematic circuit diagram of a matrix circuit unit implemented in FIG. 7 according to an embodiment of the disclosure. In this embodiment, a key 71 in FIG. 7 corresponds to the Insert key of the keyboard input device, a key 72 in FIG. 7 corresponds to the Home key of the keyboard input device, a key 73 in FIG. 7 corresponds to the Delete key, the key 71 corresponds to a key 830 in FIG. 8, the key 72 corresponds to a key 810 in FIG. 8, and the key 73 corresponds to a key 840 in FIG. 8.

Firstly, when the key 71 and the key 72 which respectively correspond to the key 830 and the key 810 are pressed, the circuit node 83 and the circuit node 81 electrically connect to the processing unit 22 simultaneously. Herein, if the key 73 corresponding to the key 840 is pressed imprudently, the first circuit node 84 and the second circuit node 82 electrically connect to the processing unit 22. Therefore, the processing unit 22 has to determine to output a signal specifying a key definition of the first circuit node 84 or the second circuit node 82, so as to avoid the ghost key phenomenon.

Assume that the matrix circuit unit 21 is scanned from up to down and from left to right, and none of the key 840 and a key which respectively correspond to the first circuit node 84 and the second circuit node 82 is preset as a null key. The processing unit 22 successively analyzes a key definition of the first circuit node 84 and a key definition of the second circuit node 82 so that knows neither the key definition of the first circuit node 84 nor the key definition of the second circuit node 82 represent the null key. Herein, the processing unit 22 cannot determine where the triggering signal comes from, so sets the triggering signal as a failed signal.

In the disclosure, the processing unit receives a triggering signal from the matrix circuit unit to determine whether the triggering signal corresponding to the first key definition of the first circuit node and the second key definition of the second circuit node represents a null key, so as to output a signal specifying the first key definition or the second key definition or to set the triggering signal as a failed signal. In this way, the ghost key phenomenon may be avoided.

What is claimed is:

1. A keystroke determination method, being applicable to a keyboard input device, and comprising:
   receiving a triggering signal corresponding to both a first circuit node of a matrix circuit unit of the keyboard input device and a second circuit node of the matrix circuit unit of the keyboard input device;
   determining whether a first key definition of the first circuit node represents a null key; and
   outputting a signal specifying a second key definition of the second circuit node when the first key definition of the first circuit node represents the null key.

2. The keystroke determination method according to claim 1, wherein the triggering signal is outputted by a matrix circuit unit formed by crossing x-axis circuits with y-axis circuits.

3. The keystroke determination method according to claim 1, further comprising:

determining whether the second key definition of the second circuit node represents the null key when the first key definition of the first circuit node does not represent the null key; and outputting a signal specifying the first key definition of the first circuit node when the second key definition of the second circuit node represents the null key.

4. The keystroke determination method according to claim 3, further comprising:

when the second key definition of the second circuit node does not represent the null key, setting the triggering signal as a failed signal.

5. The keystroke determination method according to claim 1, further comprising:

determining whether the first key definition of the first circuit node represents a specific function key; and outputting the signal specifying the second key definition of the second circuit node when the first key definition of the first circuit node represents the specific function key.

6. The keystroke determination method according to claim 1, wherein the keyboard input device wirelessly or wiredly connects to a terminal device.

7. The keystroke determination method according to claim 1, wherein the null key represents that a key definition of the null key has not been defined.

8. A keystroke determination device, being applicable to a keyboard input device, and comprising:

a key unit;

a matrix circuit unit, connected to the key unit, and used for outputting a triggering signal, wherein the triggering signal corresponds to both a first circuit node and a second circuit node of the matrix circuit unit; and a processing unit, connected to the matrix circuit unit, and used for receiving the triggering signal, and determining whether a first key definition of the first circuit node represents a null key, wherein when the first key definition of the first circuit node represents the null key, the processing unit outputs a signal specifying a second key definition of the second circuit node.

9. The keystroke determination device according to claim 8, wherein the key unit comprises a plurality of keys.

10. The keystroke determination device according to claim 8, wherein when the first key definition of the first circuit node and the second key definition of the second circuit node do not represent the null key, the processing unit sets the triggering signal as a failed signal.

11. The keystroke determination device according to claim 8, wherein when the first key definition of the first circuit node represents the null key, the processing unit outputs the second key definition of the second circuit node.

12. The keystroke determination device according to claim 8, wherein the processing unit is further used for determining whether the first key definition of the first circuit node represents a specific function key, and when the first key definition of the first circuit node represents the specific function key, the processing unit outputs the signal specifying the second key definition of the second circuit node.

13. The keystroke determination device according to claim 8, wherein the null key represents that a key definition of the null key has not been defined.

14. The keystroke determination device according to claim 8, wherein the matrix circuit unit is formed by crossing x-axis circuits with y-axis circuits.

* * * * *